Aug. 18, 1970
K. P. LALLY
3,525,091
ELECTROLUMINESCENT DISPLAY APPARATUS POSSESSING APPARENT IMAGE MOTION
Filed Dec. 22, 1966
3 Sheets-Sheet 1
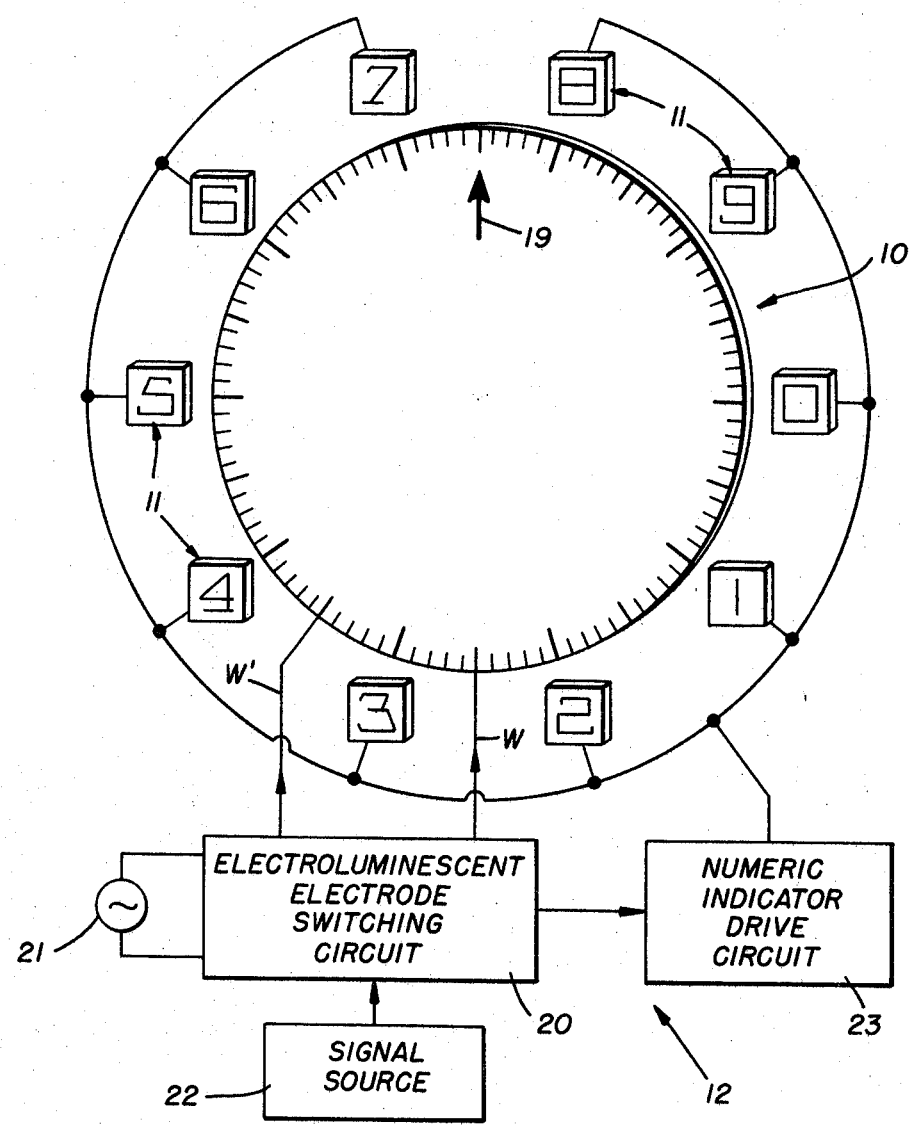
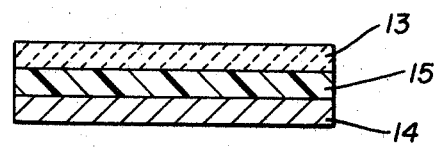
INVENTOR.
KENNETH P. LALLY
BY
MAHONEY, MILLER & RAMBO
BY Wm. V. Miller
ATTORNEYS

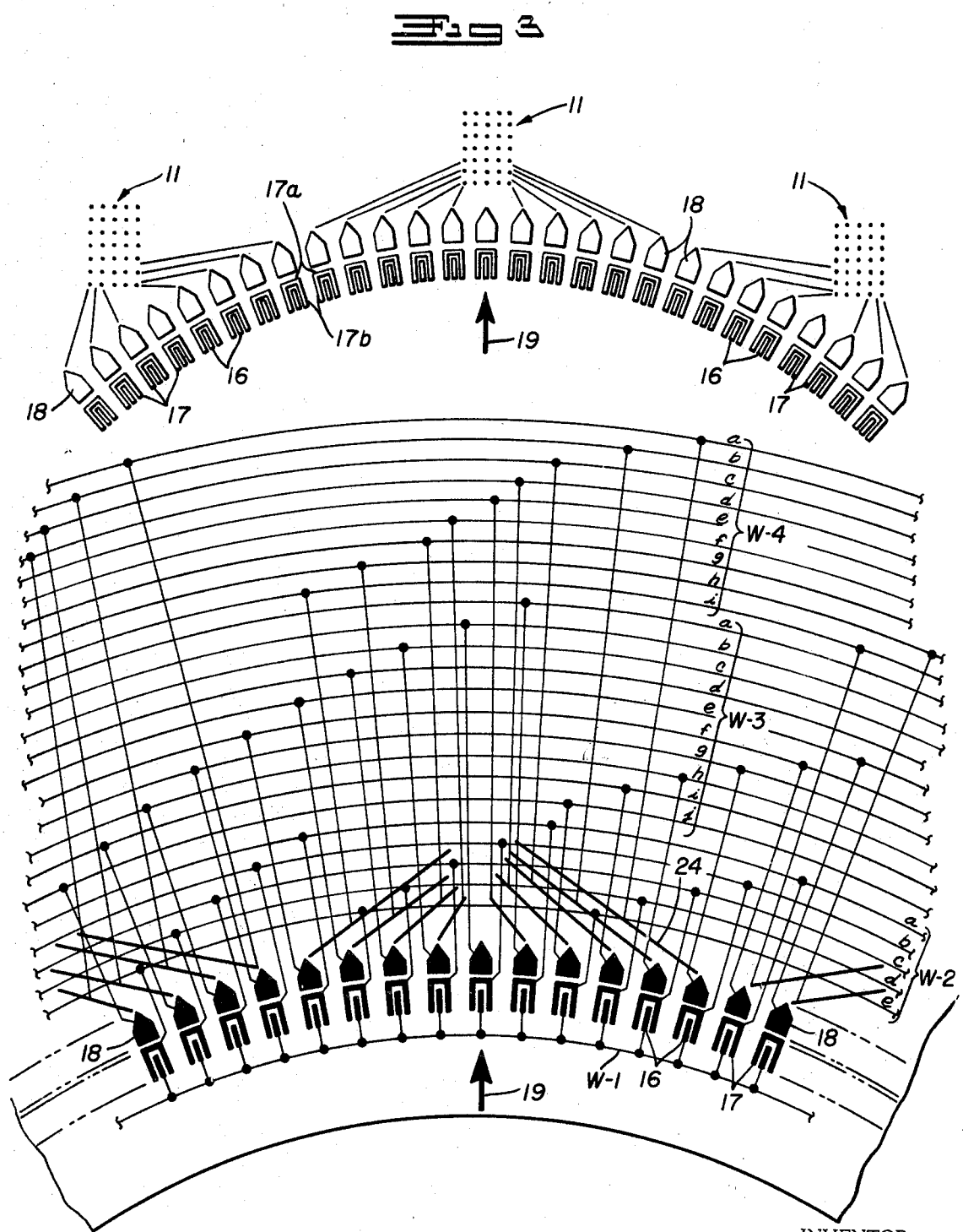

United States Patent Office 3,525,091
Patented Aug. 18, 1970

3,525,091
ELECTROLUMINESCENT DISPLAY APPARATUS POSSESSING APPARENT IMAGE MOTION
Kenneth P. Lally, Smithtown, N.Y., assignor, by mesne assignments, to Hartman Systems Co., Inc., Huntington Station, N.Y., a corporation of Ohio
Filed Dec. 22, 1966, Ser. No. 604,010
Int. Cl. G08b 5/00; H01j 1/62
U.S. Cl. 340—324       7 Claims

ABSTRACT OF THE DISCLOSURE

This display apparatus, which is particularly adaptive to scale type indicating instruments, forms a visual display having apparent image motion or relative movement of the scale and a reference index. The apparatus includes an electro-luminescent device constructed with a multiplicity of electrodes relatively disposed to form the scale of an indicating instrument with an electrical potential being applied to selected electrodes to form an analog display. An electronic switching circuit interconnected with the electrodes and responsive to a digital input signal activates selected electrodes resulting in luminescence of related areas of the scale thereby providing an analog display with a change in the input signal causing a related change in which electrodes are activated which gives the appearance of relative movement of the scale and a reference index. Auxiliary indicia display devices capable of alternatively displaying selected indicia may be incorporated in the apparatus and controlled by the switching circuit to provide reference values for the scale indication.

---

Figure 5:
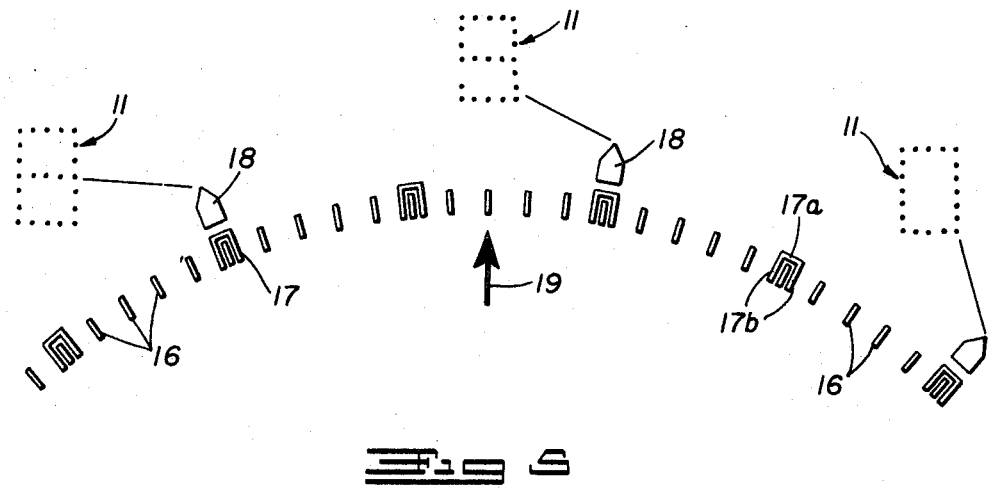

The electroluminescent display apparatus described in the following specification and illustrated in the drawings may advantageously incorporate the related Apparatus of Electro-luminescent Display Devices disclosed in my copending application for patent, Ser. No. 409,639, filed Nov. 9, 1964, now issued as Pat. No. 3,376,452, dated Apr. 2, 1968 as will be specifically indicated in this specification.

The display apparatus of this invention comprises an electroluminescent scale display device having a plurality of electrode sets with each set including a multiplicity of electrodes which are relatively arranged to define scale increments of an analog indicating device. All electrodes in one set of electrodes are activated concurrently to form a base scale with the electrodes defining the scale increments. At least one other set of electrodes having the same number of electrodes as the first set is included in the display device with the electrodes being relatively aligned as between the two electrode sets. Selective activation of electrodes in the second set of electrodes is effected by an electronic switching circuit which is responsive to an input signal containing digital information with the electrodes being interconnected in a pattern according to the particular number system utilized. These electrodes are interconnected in multiples of the scale increments thus forming major indicia or scale divisions and activation of one interconnected group of electrodes by the switching circuit in response to the input signal results in visual representation of a particular scale arrangement which is related to a reference index providing an analog output indication. Activation of another interconnected group of electrodes by the switching circuit in response to a different input signal will result in an apparent displacement of the scale relative to the reference index to display the change in analog output signal.

A numeric readout is obtained by assigning a numeric value to certain of the major indicia-forming-electrodes and forming a visual indication of the numeric value by means of auxiliary indicia display devices which may be electrically driven for incorporation in the switching circuit for control. The auxiliary indicia display devices are maintained in a fixed position relative to the electroluminescent display device with the electrodes of the display device being constructed to provide an indication of the relationship of the activated major-indicia forming-electrodes to the auxiliary indicia display devices. The auxiliary indicia display devices may be of an electroluminescent type to form a complete solid-state display apparatus.

This display apparatus of this invention provides an analog readout which is desired in the case of many indicating devices but the utilization of solid-state construction in the form of electroluminescent devices eliminates the disadvantages of an electromechanical type analog indicating device. Apparent motion of the scale, that is, no physical motion of the indicating elements, avoids mechanical operating problems and permits arrangement of the indicia in an erect orientation for improved readability. Such a display apparatus may be compactly constructed as a self-contained unit with internal illumination.

These and other features and advantages of the present invention will be readily apparent from the following detailed description of an embodiment thereof and the accompanying drawings.

Figure 6:
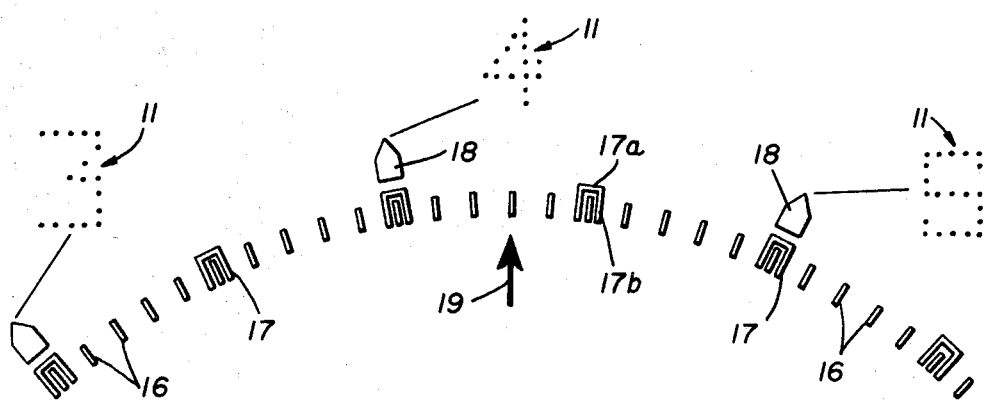

In the drawings:
FIG. 1 is a diagrammatic representation of a display apparatus embodying this invention.
FIG. 2 is a transverse sectional view of a typical electroluminescent device illustrating the structure.
FIG. 3 is a fragmentary plan view of the electrode arrangement of a portion of the electroluminescent display device.
FIG. 4 is a fragmentary plan view of the electrode arrangement of FIG. 2 and illustrating the electrical interconnection of the several electrodes.
FIGS. 5 and 6 illustrate two typical analog displays obtainable with the display apparatus.

A display apparatus embodying this invention diagrammatically shown in FIG. 1 is of the circular scale type. Such a circular type display apparatus may be utilized for various indicating functions where digital information is presented in an analog format with the parameter of interest being assigned a numeric value. Illustrative of such applications are electrical quantity measuring devices and related counter devices which provide a digital input signal to the display apparatus. Such a display apparatus finds a particularly important application in the field of aircraft navigation instrumentation which utilizes a compass rose providing heading information and which comprises a scale of circular configuration adapted to be revolved relative to an index. Adaptation of such a display apparatus embodying this invention to other specific applications will be readily apparent from the detailed description of the apparatus.

Referring specifically to FIG. 1, the display apparatus is seen to comprise an electroluminescent scale display device 10, a plurality of indicia display indicators 11 and the several components of an electronic drive and control circuit 12. The electroluminescent scale display device 10 is of a circular configuration having a planar viewing surface and each auxiliary indicia display indicator 11, ten such indicators in this instance, is also formed with a planar viewing surface and is of a type designed to present a visual display of any of several selected numerical indicia. In this example, each indicator 11 is designed to display any of the numerals 0–9 for a conventional decimal numbering system, with the display device 10 having a scale configuration to correspond with the numeric indicators 11. The numeric display indicators 11 are disposed about the periphery of the display device 10 in uniform, angularly spaced relationship and are supported in fixed relationship thereto. Preferably the electroluminescent scale display device 10 and the several numeric display indicators 11 are incorporated in a single structural housing (not shown) with the viewing surfaces of the several elements being disposed in the same plane for convenience of viewing.

The physical structure of the electroluminescent scale display device 10 (see FIG. 2) is constructed in accordance with well known principles and comprises, in general, three superimposed layers including a first electrode layer 13, a second electrode layer 14, and a layer of electroluminescent material 15 interposed between the two electrode layers. The layer of electroluminescent material comprises a suitable phosphor dispersed in a dielectric medium, such as zinc sulphide dispersed in a light-transmitting synthetic resin having the necessary dielectric characteristic. One electrode layer must also be formed from a material which is at least translucent, such as a thin film of cadmium oxide, deposited on a suitable structurally supporting substrate (not shown). In this instance, the first electrode layer 13 is assumed to be most closely adjacent the front of the instrument and will thus form the viewing surface of the electroluminescent scale display device as well as the electrically conductive circuit element and may be formed as a continuous film of circular configuration. The second electrode layer 14 need not be light-transmitting and may be formed from a thin film of copper having the necessary electrically conductive properties. In this embodiment of the invention, the second electrode layer 14 comprises a multiplicity of discrete electrically conductive electrodes which are selectively connectable to a suitable source of electrical energy by the electronic circuitry 12. As is well known, excitation of such a display device is accomplished by application of an electrical potential to opposed surface portions of the electrode layers 13 and 14 thus forming an electric field gradient across the layer of electroluminescent material 15, which electric field is of a suitable frequency and amplitude to cause the electroluminescent phosphor to luminesce and thereby emit light. Although only the basic elemental components of a typical electroluminescent display device are shown in FIG. 2, it is to be understood that the electrode layers are applied to suitable substrates which provide the necessary structural strength for such a device. In addition, it will be understood that other layers of materials may be interposed in the basic structure to obtain specific operating characteristics. Such constructional details do not form a part of this invention and are not further described or illustrated herein.

Apparent image motion of the electroluminescent scale display device 10 in effecting an analog display is accomplished by the physical arrangement of the multiplicity of electrically discrete electrodes forming the second electrode layer 14 and the excitation of the electroluminescent phosphors dispersed in the layer 15 through selective application of an electrical potential to specific electrodes by the electronic circuitry 12. It is to be understood that the electric potential applied to any specific electrode forming the second electrode layer 14 is considered relative to the first electrode layer 13 and thus forms an electric field gradient in the layer of electroluminescent material 15 in a space which is defined by that specific electrode. Subsequent references to the application of an electric potential to the specific electrodes of this second electrode layer 14 will be understood to include electrical interconnection with the first electrode layer 13 to form the necessary opposed pairs of electrode surfaces necessary to form the required electric field gradient in the layer of electroluminescent material 15. In the illustrated embodiment of the apparatus, as shown in FIG. 1, the first electrode layer 13 comprises a single electrode of circular configuration and which is of an extent to have a surface portion disposed in opposed relationship to a surface of any of the electrodes forming the second electrode layer 14.

The arrangement of the electrically discrete electrodes forming the second electrode layer 14 is shown in the fragmentary plan view of FIG. 3. FIG. 3 illustrates a segmental portion of the second electrode layer 14 of the scale display device of FIG. 1 as the electrodes would be formed on a suitable substrate (not shown) and is of an extent which encompasses at least three of the numeric display indicators 11. Included in this second electrode layer 14 is a first set of electrically discrete electrodes which may be referred to as the scale increment electrodes 16. These scale increment electrodes 16, in the case of a linear scale arrangement, are uniformly, angularly displaced in a circular configuration and each scale increment electrode represents an increase or change in the analog display of a predetermined unit value. For the illustrated decimal display, each electrode 16 thus represents a single unit change with ten such electrodes forming a major unit increment as defined by the numeric display indicators 11. The partciular physical format of the electrodes 16 may be constructed as desired to provide a readily readable display. In the illustrated embodiment, each of the electrodes 16 is formed as a rectangularly shaped plate with a relatively small width and is radially disposed in a circular configuration.

A second set of electrically discrete electrodes 17, equal in number to the first set of electrodes 16, are disposed in a circular configuration with each electrode of this second set associated with a specific one of the electrodes 16 of the first set and aligned with a radial extending through the first electrode 16. A particularly advantageous configuration for the electrodes 17 is the U-shaped structure shown in FIG. 3. Each of the electrodes 17 includes a base portion 17a interconnecting two elongated legs 17b which extend along either side of the electrode 16 and thus substantially encloses the associated electrode 16. When an electric potential is concurrently applied to a pair of associated electrodes 16 and 17, a relatively greater localized area of the electroluminescent material is caused to luminesce as when compared with the area caused to luminesce by a single first electrode 16. Thus, the concurrent excitation of the layer of electroluminescent material by a pair of electrodes 16 and 17 will form an accented indicia and application of an electric potential to selected groups of electrodes 17 in the second electrode set will result in apparent movement of the scale as will be subsequently explained in detail.

To further facilitate interpretation of the display and enhance the effect of apparent scale movement, a third set of electrically discrete electrodes 18 equal in number to the first and second sets 16 and 17, is provided with the electrodes disposed in a circular configuration but displaced radially outward from the first two sets with each electrode 18 of the third set being aligned on a radial with an associated first electrode 16 and second electrode 17. The electrodes 18 may be of the illustrated configuration approximating an outwardly pointing index mark with the base thereof spaced from the base of the second electrode 17. Application of an activating electric potential to a third electrode 18 will thus serve to further accent an associated pair of electrodes 16 and 17.

In the several figures of the drawings, each electrode in any one set of electrodes is shown as spaced a distance from a radially aligned electrode in an adjacent set of electrodes thereby forming intervening areas which apparently do not luminesce. This spacing of electrodes has been exaggerated in the several figures of the drawings for the sake of clarity in illustrating and describing the electrodes forming the sets of electrodes and their relative arrangement. In a preferred embodiment of the electroluminescent display apparatus, this interelectrode spacing would be minimized to the extent that little or no apparent gap appears between any two areas of electroluminescent material superimposed on electrodes in adjacent sets of electrodes which are radially aligned when such areas are caused to luminesce. Luminescence of the material in such a preferred embodiment will give the impression of a single area for improved readability.

The effect of simultaneous activation of groups of associated electrodes is illustrated in FIG. 5. In the normal application of the apparatus, all electrodes 16 of the first set defining the scale increments, will be concurrently energized and thus form a continuous circular scale of luminescent areas of the electroluminescent layer 15. An activating electric potential, however, would normally be applied to only those electrodes 17 of the second set which are spaced at uniform multiples of the scale increment electrodes 16. Referring to FIG. 5, it will be seen that the electrodes 17 are activated at increments of five of the scale increment electrodes 16. Similarly, the electrodes 18 of the third set are only activated in multiples of the electrodes of the first and second sets 16 and 17, which, as is illustrated, encompass ten of the scale increment electrodes 16 and two of electrodes 17. Thus, the electroluminescent scale will be illuminated in a configuration which greatly facilitates interpretation of the digital information displayed as an analog function.

In order to provide a meaningful indication relative to a particular scale position, it is necessary that an index or base position indication be provided. This is accomplished by the provision of a reference position electrode or reference index 19. Such a reference index 19 may have a configuration approximating that of an arrow pointing toward a specific electrode 16, as illustrated in the several figures of the drawings, and which will be visible on the face of the display apparatus. A suitable reference index 19 may be merely formed on the face of the electroluminescent scale display device 10 or, more advantageously, the index may comprise an electrode incorporated in the second electrode layer 14 of the device and to which an electric potential is applied to produce luminescence of the electroluminescent material layer 15 at that particular location.

The electroluminescent display apparatus disclosed herein may be constructed as indicating instrument which also incorporates an electroluminescent display device such as is disclosed in my copending application, Ser. No. 409,639, filed Nov. 9, 1964, now issued as Pat. No. 3,376,452, dated Apr. 2, 1968. The display device disclosed therein could be utilized in the present display apparatus to provide the reference index and, with the appropriate electrical circuitry, form a fully integrated indicating instrument of the type utilized in air navigation equipment in which a compass rose revolves to provide heading information and a pointer device revolvable relative to the compass rose provides relative bearing information to a radio navigation facility. In such an instrument, the display device of my copending application would form the pointer device and thus provide an auxiliary reference index which would be utilized in conjunction with sets of electrodes 16, 17 and 18. The electrical circuitry necessary to construct an instrument of this type will be readily apparent to a person skilled in this art and will not be further described or illustrated.

Electrical interconnection of the electrodes in the first, second and third sets of electrodes is illustrated in FIG. 4, which shows a typical electrical conductor network. All of the electrodes 16 in the first set of electrodes are interconnected by a single electrical conductor W-1 as all of these electrodes are simultaneously connected to a source of electrical power for activation of the electroluminescent material 15 in forming the scale increments. Every fifth electrode 17 forming the second set of electrodes is electrically interconnected by one conductor $a-e$ of the conductor group W-2 with only one conductor being connected to a suitable power source at any one time and thus activate the electroluminescent material 15 associated with every fifth electrode 17 and form the minor indicia. In a similar manner, every tenth electrode of the third set of electrodes is interconnected by one of a group of conductors W-3 with the specific conductor being further identified by the subscript $a-j$. Only one conductor of group W-3 will be energized at any one time resulting in activation of the electroluminescent material 15 in a space defined by every tenth electrode 18 and thus forms the major scale indicia. Selective control over the application of an electric potential to the desired electrodes 17 and 18 in the second and third sets may be effected through a suitable switching circuit 20 which is included in the electronic circuitry 12 and is operative to connect the desired electrodes to a source of electrical power 21. The groups of electrical conductors W-1, -2 and -3, which are connected with respective sets of electrodes 16, 17 and 18, are indicated in FIG. 1 as connected to the switching circuit 20 by the conductor W which represents the several conductors while the first electrode layer 13 is indicated to be connected to the switching circuit and to the source of electrical power 21 by the conductor W'. The switching circuit 20 may be any one of several well known types responsive to a digital input that may be supplied by a signal source 22 and includes counter and switching circuits for selectively connecting a particular conductor in each of the electrode groups to the source of electrical power 21 for activation of selected areas of electroluminescent material 15 associated with specific groups of electrodes in the second and third sets of electrodes to provide the major and minor indicia indications for the scale display. The specific circuits utilized are of well known construction and are not illustrated or described in detail.

The mechanics of the operation will now be briefly described with reference to FIG. 5 to illustrate the operation of the apparatus in providing an analog output with a digital designation. Included in this diagram for reference purposes are three numerical indicia which are utilized to assign a numerical value to particular indicia in this example. It is assumed that a digital signal supplied by the signal source 22 having an assigned value of 87 is applied to the switching circuit 20. In response to this particular signal, the switching circuit operates to connect the appropriate electrodes 17 and 18 of the second and third sets of electrodes to the electrical power source 21. Thus, a particular group of electrodes 17 will be connected to the power source 21 by an appropriate conductor of the group W-2 and cause the areas of electroluminescent material 15 associated with these electrodes to luminesce and thereby form minor indicia at every fifth scale increment. In addition, a specific group of electrodes 18 are also connected to the power source 21 by an appropriate conductor of the group W-3 and results in luminescence of the areas of electroluminescent material 15 associated with the selected electrodes 18 and form the major indicia. The electrodes 18 are selected to be coincident with respective ones of the minor indicia electrodes 17. With the numeric value 8 arbitrarily assigned to the major indicia electrode 18 appearing at the left side of the FIG. 5, it will be seen that the reference index 19 is aligned with the seventh scale increment electrode 16 appearing to the right of this major indicia. Thus, a digital value of 87 will be displayed by the apparatus but in the manner of an analog display typical of the conventional indicating instruments.

To further illustrate the operation of this apparatus, it will be assumed that the input signal will be altered to provide a digital input value of 86. In response to this change, the switching circuit 20 will operate to connect a different conductor in each of the respective groups W-2 and W-3 of conductors and thereby connect a different minor and major indicia electrode 17 and 18 to the electrical power source 21. The effect of this operation, having reference to FIG. 5, would be that the minor indicia electrodes 17 associated with the scale increment electrodes 16 at the position immediately to the right of the electrodes 17 previously energized would be connected to the source of electrical power 21 and thereby cause the electroluminescent material 15 to luminesce at this position. This effect is illustrated by the broken line representations of these electrodes and to an observer, it would appear that the images representing the particular major and minor indicia have been displaced to the right a distance corresponding to one scale increment. Now the reference index 19 will be aligned with the sixth scale increment to the right of the major indicia electrode 18 which has the assigned value of 8. Thus, the indication of the apparatus will be a numerical value of 86 in accordance with the input digital signal supplied by the signal source 22.

It will be readily seen that the particular numerical value indicated by the relative positions of the reference index 19 and the major and minor indicia 18 and 17 which are connected to the electrical power source 21 and cause the associated areas of the electroluminescent layer 15 to luminesce will be responsive to the input signal. Although the electrodes themselves do not physically move, the major and minor indicia electrodes 18 and 17 will appear at the selected locations about the periphery of the electroluminescent scale display device 10. In the decimal type numerical system illustrated wherein ten scale increments are included between two major indicia electrodes 18, the selection of a major indicia electrode 18 would be limited to one of ten such electrodes. Within the same range of ten scale increments, two of the minor indicia electrodes 17 would be connected to the electrical power source 21 and cause luminescence. Of the two minor indicia electrodes 17 which are connected to the electrical potential, only one would be aligned with the major indicia electrode 18 with the other minor indicia electrode 17 indicating a subdivision of the ten-unit decimal increment.

A further example of the numeric indication provided by the analog display is diagrammatically illustrated in FIG. 6. This figure illustrates a similar fragmentary portion of the electroluminescent scale display device 10 as is shown in FIG. 5; however, the digital input signal is assumed to have a value of 43. Accordingly, the numeric indicia display indicators 11 would be activated to display, from left to right, the numerals 3, 4 and 5, with each indicia display indicator being associated with a particular group of major indicia electrodes 18. In this instance, the numeric indicia 4 is associated with the major indicia electrode 18 appearing immediately to the left of this numeral. The operation and function of the numeric indicia display indicators 11 will be described in further detail hereinafter. In response to the digital input signal associated with the numeral 43, the switching circuit 20 will operate to connect the appropriate conductors of the electrode conductor groups W–2 and W–3 to connect the indicated major indicia electrodes 18 and minor indicia electrodes 17 to the electrical power source 21 and cause luminescence of the associated areas of electroluminescent material. This results in the reference index 19 being aligned with the scale increment electrode 16 which now appears as the third scale increment to the right of the major indicia electrode 18 and an associated minor indicia electrode 17. Thus, the numeral now indicated and displayed by the device is 43.

The auxiliary indicia display indicators 11 disposed around the periphery of the electroluminescent scale display device 10 may comprise any of the well known conventional type numeric designators which are commercially available. These display indicators 11 are a general purpose type capable of displaying the required number of decimal digits for the specific application of the apparatus. Preferably, the display indicators 11 would also comprise electroluminescent structures for compatablity with the scale device 10. As previously indicated, the numeric display indicators 11 are incorporated into the circuitry 12 which drives the electroluminescent scale display device 10 to correlate the numeric indication displayed relative to the scale. Each numeric indicia display indicator 11 is connected to a suitable numeric indicator drive circuit 23 which is connected to receive an input drive signal from the electroluminescent electrode switching circuit 20. Since the illustrated display apparatus is designed to provide a numeric indication having the numeric designations varying from 0–10, it will be necessary for the numeric drive circuit 23 to be of a type which is capable of activating the individual display indicators 11 to provide the appropriate signal and cause an apparent displacement of the numeric display in either a clockwise or counterclockwise direction about the electroluminescent scale display device 10. For example, referring to FIG. 1, the drive circuit 23 has activated the indicators 11 to display the numeral 7 immediately to the left of the reference index 19 with the remaining indicators displaying the appropriate numerals in sequential relationship to the numeral 7. With a change in the input signal, the circuit elements 20 and 23 would function to activate the display indicators 11 to provide the appropriate numeric display as, for example, the numeral 7 appearing immediately to the left of the reference index 19 could be replaced by the numeral 3 and the remaining indicators 11 would sequentially display the appropriate numerals as related to the numeral 3.

In the apparatus as presently described, an apparent ambiguity would be observed when the major indicia electrodes 18 which are connected to the power source causing luminescence of the electroluminescent layer 15 approximate an intermediate position between two of the numeral display indicators 11. It would normally be difficult to ascertain which of the numeric indicators the electrodes 18 should be referenced to in determining the display indication. This problem is obviated through utilization of a fourth set of electrodes in which the electrodes 24 are of a construction and configuration to form marker electrodes or lead lines between the specific major indicia electrodes 18 and a particular numeric indicia display indicator 11, as shown in FIG. 3. The major indicia electrode 18 appearing immediately below or in radial alignment with a display indicator 11 is not provided with a marker electrode but the electrodes 18 which are disposed to the right or the left of this electrode are provided with such electrodes. In the illustrated example, these electrodes 24 for a particular display indicator comprise a group of nine electrodes of elongated bar configuration which extend between the points of the major indicia electrodes 18 and the area of the display indicator 11. These electrodes 24 are electrically discrete relative to each other and the major indicia electrodes 18 and are adapted to be connected to a source of electric potential in accordance with energization of the major indicia electrodes. These electrodes 24 are connected in groups with every ninth electrode being interconnected and the groups of electrodes being connected to the switching circuit 20 by respective conductors of a fourth group of conductors W–4. The function of the marker electrodes 24 is illustrated in FIGS. 5 and 6 where it is apparent that these electrodes provide a reference between the major indicia electrodes 18 and the related numeric display indicator 11. Activation of the numerical indicia display indicators 11 in conjunction with the electroluminescent scale display device 10 further enhances the appearance of apparent image motion as the numerical scale designations will be changed to retain the analog display at the top of the display apparatus. This facilitates interpretation of the display as the display is maintained in the same general orientation relative to an observer. This feature is of advantage in the case of a circular display instrument in that all numeric display indicators 11 may be oriented in an erect position relative to an observer which is of particular importance in navigation instruments where a single scale is often utilized to provide additional information.

The apparatus illustrated and described hereinbefore has been related to a circular type indicating instrument but it will be readily apparent that the invention is not limited to this specific type of display. For example, referring to FIGS. 5 and 6, it will be readily apparent that the display apparatus could be limited to only a portion of a circular arc as is illustrated rather than displaying an entire circular scale. The individual elements in such an apparatus would function in an identical manner but with a substantially reduced number of electrodes in either of the three sets. In addition, the number of numeric indicators required would be reduced to those that would be effective in providing the display. Three numeric indicators would be sufficient in the illustrated examples of FIGS. 5 and 6. It will also be apparent that the scale configuration need not approximate a circular arc as the indicia electrodes forming the scale increments and major and minor indicia electrodes 17 and 18 may be aligned in a straight line. This will form a straight line scale with the selective application of potential to particular electrodes providing the apparent image motion of the scale in cooperation with the numeric indicia display indicators 11. The specific number of electrodes and their electrical interconnection illustrated and described herein is not to be considered as a limitation of the scale configurations which may be incorporated in a display apparatus embodying this invention and is to be considered as illustrative only.

The display apparatus has been described hereinbefore in an application having a non-linear scale. By utilizing the electroluminescent scale device 10 and indicia display indicators 11 but modifying the electronic circuit 12, it is possible to construct an indicating instrument in which the scale may not be linear through application of an electric potential to appropriate electrodes or to activate the display indicators in a pattern other than that illustrated. In such apparatus, the typical electrode interconnection illustrated in FIG. 4 would not be utilized as the individual electrodes in each set of electrodes would be independently connected to the power source through an appropriately constructed switching circuit. As an example, the major and minor electrodes 18 and 17 may be energized in non-uniform multiples as in a logarithmic pattern. The indicia display indicators may also be activated in a non-linear pattern, either independently or in conjunction with the scale device 10. Such non-linear operation may be utilized to effect an apparent expansion or contraction of the scale indication as may be determined appropriate for the particular parameter being observed.

Having thus described this invention, what is claimed is:

1. A display apparatus comprising
   an electroluminescent scale display device including superimposed first and second electrode layers defining coextensive surfaces of finite area and a layer of electroluminescent material interposed between and coextensive with said electrode layer surfaces and which is caused to luminesce in predetermined areas when excited by electrical energy applied to coextensive surface portions of said electrode layers producing a voltage gradient across said electroluminescent material for excitation thereof, said second electrode layer including a first set of N number of electrically discrete electrodes of finite surface area forming scale increment indicia serially disposed in relatively spaced relationship in a predetermined configuration and at least a second set of N number of electrically discrete electrodes of finite surface area forming major scale indicia serially disposed in relatively spaced relationship in the same configuration as said first set of electrodes with each electrode in said first set aligned with an electrode in said second set of electrodes,
   a reference index supported in fixed relationship to said electroluminescent scale display device to designate a specific electrode of said first set of electrodes, and
   circuit means interconnected with said electroluminescent scale display device and operable to apply electrical energy to said electrode layers for excitation of that portion of said electroluminescent material coextensive with the electrodes energized, said circuit means including a first circuit portion interconnected with said first electrode layer and said first set of electrodes of said second electrode layer for concurrently energizing all of said first set of electrodes and activating said electroluminescent material coextensive therewith and a second circuit portion interconnected with said first electrode layer and said second electrode layer for energization of selected electrodes of said second set of electrodes and actuating said electroluminescent material coextensive therewith in response to an input signal.

2. A display apparatus according to claim 1 which includes at least one indicia display indicator proximately disposed to said scale display device and capable of displaying at least two distinct indicia, and wherein said circuit means is connected with said indicia display indicator to cause said display indicator to display one of said indicia.

3. A display apparatus according to claim 1 wherein said sets of electrodes forming said second electrode layer are relatively disposed with pairs of electrodes formed by an electrode from said first electrode set and an electrode from said second electrode set being linearly aligned.

4. A display apparatus according to claim 3 wherein said second electrode layer includes a third set of N number of electrically discrete electrodes in addition to said first set and said one other set, said third set of electrodes being disposed relative to said other sets of electrodes to place an electrode of third set of electrodes in linear alignment with each said pair of electrodes, and said circuit means includes a third circuit portion interconnected with said first electrode layer and said second electrode layer to energize at least one electrode of said third set of electrodes.

5. A display apparatus according to claim 1 wherein said electroluminescent scale display device includes a set of marker electrodes formed with said second electrode layer, said marker electrodes being arranged in at least one group with each marker electrode in said group extending between a respective one of said major indicia electrodes and a space remote to said electrodes, said circuit means including a circuit portion connected with said marker electrodes and operable to energize a selected electrode.

6. A display apparatus according to claim 5 which includes at least one indicia display indicator proximately disposed to said scale display device in said space remote to said electrodes and capable of displaying at least two distinct indicia, and wherein said circuit means is connected with said indicia display indicator to cause said display indicator to display one of said indicia.

7. A display apparatus according to claim 6 comprising a circular configuration with said sets of electrodes forming said second electrode layer arranged in a closed circle.

References Cited

UNITED STATES PATENTS

| | | | |
|---|---|---|---|
| 3,275,871 | 9/1966 | Yiotis | 340—324 |
| 3,328,790 | 6/1967 | Rhodes | 340—324 |
| 3,343,155 | 9/1967 | Pahlavan | 340—324 |
| 3,371,243 | 2/1968 | Bramley et al. | 313—108 |

THOMAS B. HABECKER, Primary Examiner

M. M. CURTIS, Assistant Examiner

U.S. Cl. X.R.

313—108; 340—27